United States Patent
Perry et al.

(10) Patent No.: US 10,363,482 B2
(45) Date of Patent: *Jul. 30, 2019

(54) METHODS AND SYSTEMS FOR CLOUD EXECUTING MINI-GAMES AND SOCIAL TAGGING

(71) Applicant: Sony Interactive Entertainment America LLC, San Mateo, CA (US)

(72) Inventors: David Perry, Monarch Beach, CA (US); Victor Octav Suba Miura, Foster City, CA (US); Michael Taylor, Aliso Viejo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,996

(22) Filed: Jun. 6, 2016

(65) Prior Publication Data
US 2016/0279515 A1 Sep. 29, 2016

Related U.S. Application Data

(63) Continuation of application No. 13/779,735, filed on Feb. 27, 2013, now Pat. No. 9,358,461.
(Continued)

(51) Int. Cl.
*A63F 13/30* (2014.01)
*A63F 13/355* (2014.01)
(Continued)

(52) U.S. Cl.
CPC ............ *A63F 13/355* (2014.09); *A63F 13/12* (2013.01); *A63F 13/5372* (2014.09); *A63F 13/63* (2014.09); *A63F 13/77* (2014.09); *A63F 13/798* (2014.09); *A63F 13/86* (2014.09); *A63F 13/88* (2014.09)

(58) Field of Classification Search
CPC ................................. A63F 13/12; A63F 13/88
See application file for complete search history.

(56) References Cited

U.S. PATENT DOCUMENTS 7,749,056 B2 7/2010 Ando et al.
8,475,269 B2 * 7/2013 Okada ................. G07F 17/3244
463/20

(Continued)

OTHER PUBLICATIONS

Chinese Pat. App. No. 201310727302.4, PWD97731, Text of the First Office Action, English language, May 5, 2017.
(Continued)

*Primary Examiner* — Jason Skaarup
(74) *Attorney, Agent, or Firm* — Penilla IP, APC

(57) ABSTRACT

Methods for managing mini-games created and executed in a game cloud system are provided. One method includes providing a plurality of mini-games stored in the game cloud system. Each mini-game is created based on a video recording of a game play for a game title, and is shared in a social network. The method further includes identifying user interactions for each mini-game and ranking the mini-games based on the identified user interactions associated with each mini-game. Then, some or all of the mini-games are displayed on a game site and/or a social network site in an order that is based on the ranking.

20 Claims, 12 Drawing Sheets

Related U.S. Application Data

(60) Provisional application No. 61/746,083, filed on Dec. 26, 2012.

(51) Int. Cl.
*A63F 13/798* (2014.01)
*A63F 13/88* (2014.01)
*A63F 13/5372* (2014.01)
*A63F 13/63* (2014.01)
*A63F 13/77* (2014.01)
*A63F 13/86* (2014.01)

(56) References Cited

U.S. PATENT DOCUMENTS

| | | |
|---|---|---|
| 8,815,253 B2 | 8/2014 | Malyala et al. |
| 8,929,721 B2 | 1/2015 | Cottrell |
| 2004/0267386 A1 | 12/2004 | Hightower |
| 2006/0287029 A1* | 12/2006 | Yoshinobu ............... A63F 13/10 463/9 |
| 2007/0004482 A1 | 1/2007 | Ando et al. |
| 2008/0004115 A1* | 1/2008 | Chatani .................. A63F 13/12 463/40 |
| 2008/0076546 A1* | 3/2008 | Moyle .................... G07F 17/32 463/29 |
| 2009/0036220 A1* | 2/2009 | Nagashima ............. A63F 13/00 463/43 |
| 2009/0208181 A1 | 8/2009 | Cottrell |
| 2011/0281648 A1 | 11/2011 | Weising |
| 2012/0134651 A1* | 5/2012 | Cottrell ................ A63F 13/497 386/278 |
| 2012/0323898 A1* | 12/2012 | Kumar ............. G06F 17/30899 707/723 |
| 2013/0172086 A1 | 7/2013 | Ikenaga |
| 2014/0038721 A1* | 2/2014 | Archer ................. A63F 13/795 3/795 |
| 2014/0066177 A1* | 3/2014 | Zalewski ................ A63F 13/12 463/24 |
| 2014/0094314 A1* | 4/2014 | Watson ................... A63F 13/10 463/42 |
| 2014/0179427 A1* | 6/2014 | Miura ..................... A63F 13/00 463/31 |
| 2014/0187323 A1* | 7/2014 | Perry ..................... A63F 13/10 463/31 |

OTHER PUBLICATIONS

Chinese Pat. App. No. 201310727302.4, PWD97731, Text of the Second Office Action, English language, Feb. 5, 2018.

* cited by examiner

MINI-GAME NAME:
ORIGINAL GAME TITLE:
MINI-GAME CODE:
MINI-GAME BEGINNING DATA:
MINI-GAME ENDING DATA:
TAG CONTENT:
 - GAME TAG DATA:
 - MINI-GAME TAG DATA:
SOCIAL NETWORK CONTENT:
 - SHARED:
 - PLAYED:
 - VIEWED:
 - RECOMMENDED:
 - COMMENTS:
 - MINI-GAME PLAY VIDEOS:

MINI-GAME CREATOR:
MINI-GAME CREATION TIME:
MINI-GAME CLASSIFICATION:
MINI-GAME RANKING:

METHODS AND SYSTEMS FOR CLOUD EXECUTING MINI-GAMES AND SOCIAL TAGGING

CLAIM OF PRIORITY

This Application is a continuation of U.S. patent application Ser. No. 13/779,735, filed on Feb. 27, 2013, which is a non-provisional of U.S. Provisional Patent Application No. 61/746,083, filed on Dec. 26, 2012, and titled "Systems and Methods for Ranking of Cloud Executed Mini-Games Based on Tag Content and Social Network Content", all of which are hereby incorporated by reference.

BACKGROUND

1. Field of the Invention

The present invention relates to systems and methods for managing user created mini-games in a game cloud executed system based on user interactions.

2. Description of the Related Art

Cloud systems, using computing resources (hardware and software), deliver services over a network (typically the Internet). The services, in the context of gaming, enable streaming of content to remote clients, wherein most processing is done on servers, which may be distributed. Input provided at the remote clients will in turn drive execution of the game, without the need for dedicated gaming hardware at the client's location. Cloud gaming, therefore, has been increasing in popularity because users find it easier to access more titles without complex hardware restrictions and game suppliers find it easier manage game code from centralized locations.

It is in this context that embodiments of the invention arise.

SUMMARY

Embodiments of the present invention relate to systems and methods for managing mini-games in a game cloud executed system based on user interactions, and in particular to the ranking and displaying of particular mini-games to others to encourage sharing of such mini-games. Several inventive embodiments of the present invention are described below.

In one embodiment, a method for managing mini-games created and executed in a game cloud system is disclosed. The method includes providing a plurality of mini-games stored in the game cloud system, where each of the plurality of mini-games is created based on a video recording of a game play for a game title, and each of the plurality of mini-games is shared in a social network. The method further includes identifying the user interactions for each of the plurality of mini-games, and ranking the mini-games based on the identified user interactions associated with each mini-game, and displaying the mini-games in an order that is based on the ranking. The disclosed method is executed by a processor.

In yet another embodiment, a system having a game cloud system is disclosed. The game cloud system includes a mini-game processor, a tag processor, and a social connection manager. The mini-game processor is configured to provide a plurality of mini-games stored in the game cloud system, and each of the plurality of mini-games is created based on a video recording of a game play of a video game title. The social connection manager is configured to enable posting of at least one of the plurality of mini-games to be shared in a social network and to obtain social network content for each shared mini-game. The tag processor is further configured to obtain tag content for each shared mini-game, and the mini-game processor is further configured to rank the plurality of mini-games based in part on the tag content and the social network content associated with each mini-games.

In still yet another embodiment, another method for sharing mini-games is disclosed. The method includes generating a video recording of game play of a game title in a cloud gaming system while playing the game title online in a streaming format, enabling viewing of the video recording, providing controls to enable selection of a portion of the video recording. The method further includes generating mini-game that corresponds to the portion of the video recording selected and enabling sharing of the mini-game. The mini-game is a portion of the game title that is playable online in a streaming format and is shared with the portion of the video recording. In response to the sharing, the tag data is received from one or more users that either played the portion of the video recording or played the mini-game. The tag data is used to rank the mini-game, and the ranking is used to display the mini-game on a website in an order that is based in part on the ranking.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 3A illustrates a mini-game data profile, in accordance with one embodiment of the present invention.

DETAILED DESCRIPTION

Figure 1A:
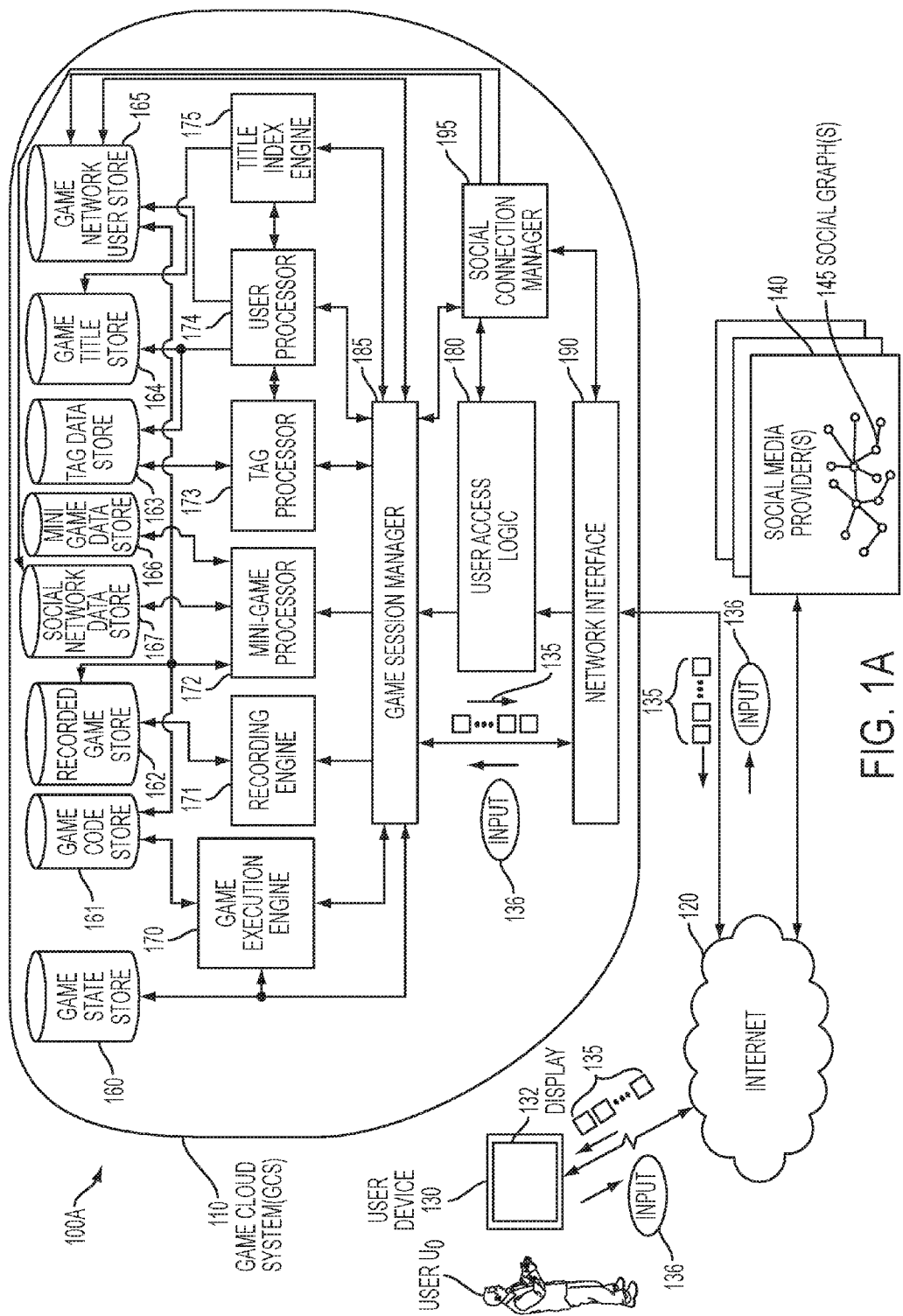
FIG. 1A illustrates a system diagram for enabling access and playing of video games stored in a game cloud system, in accordance with an embodiment of the invention.

The following embodiments describe systems and methods for managing shared mini-games in a cloud-based system. The management of the mini-games includes, but is not limited to, classifying, ranking, and displaying the shared mini-games based on user interactions associated with the mini-games.

In one embodiment, as described in greater detail below, the mini-games to be shared are custom defined by users. The creation, in one embodiment, begins by allowing users to play a full game, which they have access to play from an online database.

The game play, in one embodiment, is via a cloud based processing system that enables streaming of online game play, while allowing users to provide interactive input from remote locations that are connected to the internet. While the user plays the game, a video recording of the game is created, showing the game play activity from the game play session. In one embodiment, a user is allowed to select a portion of the video recording. The selection of the portion of the video recording is used, in one embodiment, to define the portion of the mini-game that is to be created. The user defined mini-game will therefore be a segment or part of the full game, with a defined start and end point as defined by the user. In one embodiment, the segment may have all of the features of the full game, and in other embodiments less features, objects, controls, etc., than the full game has. In one embodiment, the user defines the start and end points by selecting the start and end points in the video recording.

The result is a custom selected section of the full game, defined as an executable mini-game. As the mini-game was defined from the video recording, the mini-game may also be provided with an accompanying video recording portion, or clip. In one embodiment, as more users create mini-games, it is possible that many different mini-games can be created from the same full game title, with each mini-game having different start and end points.

Because the mini-games have customization associated with the user that created the mini-game, users may have a desire to share the mini-games with others. For example, the portion of the video recording that is associated with each mini-game will show the game play of the user that created the mini-game. The game play may show, for example, the accomplishments by the user, such as particular game scores, awards, etc.

In one embodiment, the mini-games can be shared via a game network, where users of the game network can post their created mini-games. In another embodiment, users can post links to the mini-games on social networks. As a result of the sharing, other users in the game network or social network will be allowed access to the mini-games. In one embodiment, the mini-game will include two parts; one part is the video portion showing the game play of the user that created the mini-game, and a second part is an executable mini-game that parallels the section of the full game that was used to create the mini-game.

During the sharing process, therefore, users will be allowed to view the portion of the video recording posted of the mini-game and also play the mini-game posted by the creator. During the viewing of the video recording portion or the playing of the mini-game executable portion, users can introduce tag data. The tag data can be in the form of comments, text, posting, videos, images, or other annotations. The tag data can also include ranking data. The ranking data can include the introduction of tag data that indicates likes or dislikes, number or stars, higher rating points, lower rating points, etc. The tag data, as received from users, based on the sharing of the mini-games, can be used to provide a ranking to the various posted mini-games. In other embodiments, the tag data or the rate at which mini-games are shared, viewed, played, commented on, etc., can be used to provide higher ratings to the mini-games. In one embodiment, higher rated mini-games will be provided with higher prominence on game websites. In other embodiments, mini-games that are highly rated can provide rewards to the posting user. This, in turn, may provide for a built-in mechanism to encourage better quality posting of mini-games.

In one embodiment, even though the tag data is set at one still video frame view (i.e., the image that is present on a screen when phase is selected), when the tag data is later shown, it can be allow to stay in a viewable state for a period of time, which can encompass a time when multiple frames of video are shown. For example, tag data can be shown, during playback, for several seconds. If the frame rate of the video is, for example, 60 frames per second (other frame rates are possible, either slower or faster), it should be understood that tag data can be displayed for a period of time that will involve the display of many frames of video. It is also understood that frames will, in some embodiments, include compression to reduce transmission latency.

In one embodiment, user interactions with a mini-game may include tag content and social network content associated with the mini-game. The tag content of a mini-game includes game tag data entered for video frames of the mini-game during the full game play, game tag data entered for the video frames of the mini-game during a view of part of the video recording or view of full game play recording, mini-game tag data entered during play of the mini-game, etc. The social network content of the mini-game may include the number of times the mini-game is shared, the number of times the mini-game is viewed, the number of times the mini-game is played, the number of recommendations for the mini-game, the number of comments entered for the mini-game, the number of created mini-game play videos, the rate at which mini-games are shared, the rate at which mini-games are tagged, the quality of the tag data, the number of plays by highly rated players, etc.

Each classified and ranked mini-game may be displayed based on the classifying categories in the forms of mini-game symbols (e.g., mini-game icons). When a mouse is hovered over a mini-game symbol, some of the video frames of the mini-game represented by the mini-game symbol will be automatically played. Further examples and embodiments will now be described below with reference to the exemplary drawings.

It will be obvious, however, to one skilled in the art, that the present invention may be practiced without some or all of these specific details. In other instances, well known process operations have not been described in detail in order not to unnecessarily obscure the present invention.

FIG. 1A illustrates a system diagram 100A for enabling access and playing of video games stored in a game cloud system (GCS) 110, in accordance with an embodiment of the invention. System 100A includes a GCS 110, one or more social media providers 140, and a user device 130, all of which are connected via Internet 120. Although one user device 130 is illustrated in system diagram 100A, it is to be understood that in practice, many more user devices may be connected to Internet 120 to access the services provided by GCS 110 and social media providers 140.

In one embodiment, game cloud system 110 includes a game execution engine 170, a recording engine 171, a mini-game processor 172, a tag processor 173, a user processor 174, a title index engine 175, a game session manager 185, user access logic 180, a network interface 190, and a social connection manager 195. Game cloud system 110 may further include a plurality of gaming storage systems, such as a game state store 160, a game code store 161, a recorded game store 162, a tag data store 163, a game title store 164, a game network user store 165, a mini-game data store 166, and a social network data store 167. In one embodiment, game cloud system 110 is a system that can provide game applications, services, gaming related digital content, and interconnectivity among systems, applications, users, and social networks. Game cloud system 110 may communicate with user device 130 and social media providers 140 via network interface 190 that will enable wired and wireless communication methods. In one embodiment, each social media provider 140 includes at least one social graph 145 that shows social network user interconnections.

In one embodiment, a social media provider can be the game cloud system 110 itself, whereby user relationships are managed without the need for external social media providers 140. In still other embodiments, the system can operate as a hybrid system, wherein social relationships are managed using social graph data from third party social media providers (via API interface accesses or the like) and user relationships with other users, as defined by the game cloud system.

In one embodiment, a user, e.g., user U0, can access the services provided by game cloud system 110 and social media providers 140 by way of user device 130. User device 130 can include any type of device having a processor and memory, wired or wireless, portable or not portable. User device 130, which is shown connected to Internet 120, includes a display 132 that can be a touch-screen, or a display typically provided by a flat-panel display, a cathode ray tube (CRT), or other device capable of rendering a display. Alternatively, user device 130 can have its display 132 separate from the device, similar to a desktop computer or a laptop computer. In one embodiment, user device 130 can be in the form of a smartphone, a tablet computer, or hybrids that provide touch screen capability in a portable form factor. One exemplary device can include a portable phone device that runs an operating system and is provided with access to various applications (apps) that may be obtained over Internet 120, and executed on the local portable device (e.g., smartphone, tablet, laptop, desktop, etc.).

In one embodiment, user device 130 can install an application that enables executions and views of the games stored and shared by the game cloud system 110. Further, user device 130 can be used to communicate with one or more social media provider(s) 140 via Internet 120 such that user device 130 may be used to execute a game play or view video recordings of the game plays shared in one or more social media providers 140. For example, user U0 may access a game posted in one of social media providers 140 by selecting a link on a page, stream, news-feed, or post of the social media provider, and then playing or viewing the game from user device 130.

In one embodiment, the games posted and shared in social media providers 140 are mini-games generated based on video recordings of game plays of available game titles. Those mini-games may be stored in recorded game store 162 of game cloud system 110. While user U0 is executing or viewing a game or mini-game stored in game cloud system 110, user device 130 is capable of receiving game video frames 135 from game cloud system 110 and transmitting user interactive input 136 (simply "input") to game cloud system 110. The received game video frames 135 can be shown in display 132 of user device 130.

In one embodiment, a user, e.g., user U0, may create a user account and register the created user account with game cloud system 110. After the user account is registered with game cloud system 110, game cloud system 110 may provide a user ID to this registered user account and save the user ID in a user profile associated with the registered user account. The user profile associated with a user account will be described in more detail with reference to FIG. 1C. In one embodiment, the user profile associated with a user account may be saved in a user database in game network user store 165.

In one embodiment, user access logic 180 may be used to detect all accesses made by user U0, either through user device 130 or other suitable devices, and be used to verify the user log-in information (e.g., the name and password for the user account of user U0). After user U0 logs into his or her user account, user access logic 180 may communicate the user login information with user processor 174 that in turn updates the user login information stored in the user profile. Further, user access logic 180 may communicate the user login information with social connection manager 195, so that social connection manager 195 can pull the names of the user's social network friends from one or more social media providers 140 via network interface 190. The names of the user's social network friends may be received by social connection manager 195, which in turn transmits the received information to game network user store 165 to be saved in the user profile of user U0.

After logging in, the user can access services provided by game cloud system 110 via game session manager 185. For example, game session manager 185 may inform user processor 174 of the user login information so that user processor 174 may record or update the user login information in the user profile associated with this user. In one embodiment, the user profile is stored in game network user store 165. User processor 174 may also communicate with title index engine 175 to identify game titles associated with the user account. The game titles associated with the user account may be previously purchased by the user, previously played by the user and/or free game titles identified and made available by the game providers. In this example, available game titles may therefore be stored in game title store 164.

In one embodiment, after a user chooses an available game title to play, a game session for the chosen game title may be initiated by the user through game session manager 185. Game session manager 185 first accesses game state store 160 to retrieve the saved game state of the last session played by the user (for the selected game), if any, so that the user can restart the game play from a previous game play stop point. Once the resume or start point is identified, the game session manager 185 may inform game execution engine 170 to execute the game code of the chosen game title stored in game code store 161. After a game session is initiated, game session manager 185 may pass the game video frames 135 (i.e., streaming video data), via network interface 190 to a user device, e.g., user device 130.

During game play, game session manager 185 may communicate with game execution engine 170, recording engine 171, and tag processor 173 to generate or save a recording (e.g., video) of the game play or game play session as the game play processes. In one embodiment, the video recording of the game play can include game tag data entered or provided during game play, and other game related metadata. The video recording of game play may be saved in recorded game store 162. Any game tag data may be saved in tag data store 163, and the metadata may be saved in game state store 160. More detail regarding the process of tagging content will be described below.

In one embodiment, a mini-game may be created using information from the video recording of the game play, e.g., via mini-game processor 172. For example, after a user plays a game and the video recording is created, the user can simply watch a reply of the video recording if his or her prior game play. When the user is watching a reply of the video recording, the user may find one or more parts to be particularly interesting. For example, the user may have achieved a high score or completed an interesting task during the game play. The user, in one embodiment, is provided with controls to select a portion of the video recording, which will then be used by mini-game processor 172 to construct a mini-game based on the selected portion of the video. In one embodiment, the mini-game will include the executable code necessary to render the functionality or part of the functionality that was used to create the content of the selected portion of the video recording.

Thus, a user wishing to play the mini-game will be provided with a substantially similar game play experience as the user that originally played the game that created the video recording. For instance, if the original game play included a scene where the user is riding a bike over a jump, and the user selects that portion from the video recording of his game play, the new mini-game would include code to enable similar or substantially similar game play. That is, the mini-game would enable the user or other users to play the mini-game, wherein game play would include riding a bike over a jump. In this case, the user playing the mini-game may or may not achieve the same game score for the jump.

The portion of the video recording associated with the created mini-game may be saved in recorded game store 162 and remaining portion of the video recording may be erased after a defined time period by recording engine 171. If no mini-games are created for a video recording of a game play, the video recording of the game play may be erased after a defined time period by recording engine 171.

In one embodiment, the created mini-game may be posted by user U0 to a webpage in a social network, via social connection manager 195, to enable sharing with his or her social network friends. Alternatively, the created mini-game may be posted by user U0 to a webpage in a game network maintained by game cloud system 110, for sharing with his or her game network friends. Sharing, however, should not be limited to friends. Sharing can also be extended to other users that may have similar likes or game play similarities.

In one embodiment, the game code that defines a mini-game can be the same code of the full game from which the mini-game was created. During the creation of the mini-game by mini-game processor 172, game play metadata, which can include game state, is used to identify what parts of the game code of the full game are needed to make an executable mini-game. When the parts of the code of the full game are all identified, the code that defines the mini-game can, in one embodiment, be defined by pointers or references to the game code of the full game. By using points and/or references, the need to create new code packages for each produced mini-game is reduced. As user's create mini-games from their game titles, the code or pointers for the created mini-games can be associated to the creating user in the user store 165. This way, each created mini-game can be defined by its original creator, and metrics regarding play of the mini-games can be attributed or linked to the creating user. For instance, if a particular user creates mini-game that are played and/or shared often with other users, the popularity of the mini-game can be tracked and ranked against other mini-games and users.

A user that creates mini-games that are shared often or tagged with higher frequency can be provided with rewards. The rewards can be provided, for example, by the developer of the game title from which the mini-games are created. As more mini-games are made from particular game titles, the game title may grow in popularity and will encourage users to purchase a full version. In one embodiment, full versions of a game title are unlocked to enable mini-game creation. In one embodiment, play of a mini-game will allow creation of video recordings of the mini-game play, but may not enable creation of mini-games without having access to the full game title.

Still continuing with FIG. 1A, in one embodiment, during a game play, user interactive input 136 entered by user U0 may be transmitted to game session manager 185 of game cloud system 110. User interactive input 136, besides input used to drive game play, may include tag content (e.g., texts, images, video recording clips, etc.) The tag content can include game tag data and mini-game tag data. Game tag data may be entered by user U0 while playing an available full game title or viewing a video recording of the game play, and mini-game tag data may be entered by user U0 while viewing a mini-game. The mini-game may be a mini-game that is created by user U0 based on a video recording of the game play, or a shared mini-game posted by other users, e.g., social network friends of user U0.

In one example, if user interactive input 136 is tag content, the tag content may be received by game session manager 185, which in turn informs tag processor 173, user processor 174 that the tag content is received. Tag processor 173 may be used to save the tag content to tag data store 163. User processor 174 may be used to save a tag pointer that points to where the tag content is stored in tag data store 163 to the user profile associated with user U0. Mini-game processor 172 may be used to save a tag pointer that points to where the tag content is stored in tag data store 163 in a mini-game data profile stored in mini-game data store 166, if the tag content is related to a mini-game.

In one embodiment, mini-game processor 172 may be used to analyze the tag content of a mini-game, and identify video frames with more tag content as a representative frame for the mini-game. For example, when a mini-game is created, the mini-game may be shown as an icon or still image. The still image may be, for example, one of the video frames of the mini-game. The more interesting the frame is, the more likely it is that the mini-game may be played by others. Thus, in this embodiment, the frame that is selected to be the still image may be automatically selected based on the tagging content associated with particular frames.

In another embodiment, mini-game processor 172 may be used to manage the mini-games stored in recorded game store 162. The mini-game management may include, but not limited to, mini-game classification, mini-game ranking based on the user interactions to the mini-games, mini-game representative picture identification, mini-game view or execution initiation, etc. For instance, if certain mini-games have a higher number of user interactions, this may indicate that the content of the mini-game is interesting and/or is being shared the most. As such, some mini-games can be displayed more prominently on a website, relative to other mini-games, based on the degree of tagging that such mini-games experience.

The user interactions of the mini-games may include the tag content and the social network content of the mini-games. In one example, mini-game processor 172 may instruct social connection manager 195, via game session manager 185, to post some or all of the mini-games stored in recorded game store 162 at one or more social media providers 140 so that those mini-games can be shared (either viewed or played) by the social network users. Social connection manager 195 may periodically pull social network content associated with those shared mini-games from social media providers 140, and save the social network content in social network data store 167.

The social network content of a shared mini-game may include, without limitation, the number of times the mini-game is viewed, played, shared, and recommended by the social network users. The social network content may also include the number of comments made by social network users. In one embodiment, mini-game processor 172 may save a social network content pointer that points to the social network content for a mini-game to the mini-game data profile associated with the mini-game.

Figure 1B:
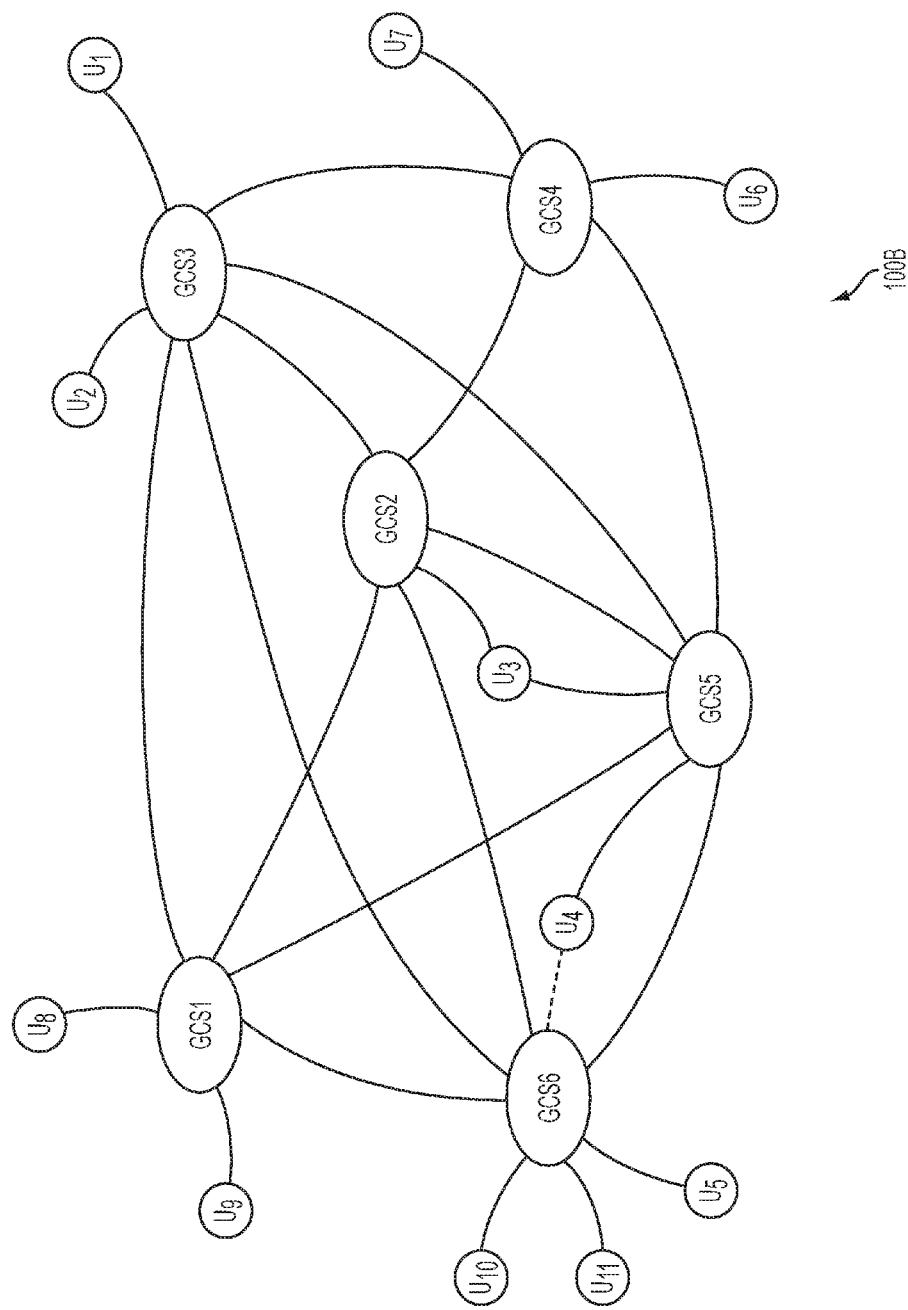
FIG. 1B illustrates a game cloud network, in accordance with one embodiment of the present invention.

FIG. 1B illustrates a game cloud network 100B, in accordance with one embodiment of the present invention. For example purposes only, the game cloud network 100B may include six game cloud systems (GCS1 to GCS 6), which are geographically distributed and interconnected. Also for purposes of example, eleven users (U1 to U11) are shown in FIG. 1B with different geographical distances to each of the six GCSs. To reduce latency, the GCSs are distributed and users that are more proximate to certain GCSs will be paired to the more local GCS.

As shown in FIG. 1B, users U1 and U2 are geographically located closer GCS3, user U3 is located about in the middle of the distance between GCS2 and GCSS, user U4 is located in between GCS 5 and GCS 6 but is closer to GCS 6, users U6 and U7 are located near GCS4, users U8 and U9 are located near GCS1, and users U5, U10, and U11 are located near GCS6. Although six game cloud systems and eleven users are shown, it is to be understood that in practice, more or less game cloud systems may be included in game cloud network 100B, and more or less users may access the services provided by game cloud network 100B.

In one embodiment, each GCS in game cloud network 100B is located in a data center that houses computer systems and associated components to support multiple operating systems. As an example, the structure of each GCS may be similar to GCS 110 as shown in FIG. 1A. Although, it should be understood that a GCS may include fewer or more processing components or logic elements, depending on the processing desired. In one embodiment, each GCS in game cloud network 100B may communicate with other GCSs so that the information for various user profiles stored in respective game network user stores of a GCS can get updated and synchronized. Through the communication among the GCSs, game cloud network 100B can dynamically distribute the work load to provide load balancing and assign users based on the work load of each GCS and distance factors.

In one embodiment, when a user is trying to log into his or her user account online via a user device, depending upon the geographical location of the user, the user may be routed to a GCS that is closest to his or her user device. For example, because user U1 along with his or her user device is located near GCS3, user U1 utilizes the game services provided GCS3 after his or her user device is connected to GCS3. Similarly, user U2 may utilize the game services provided by GCS3, user U7 and user U6 may utilize the game services provided by GCS4, user U8 and user U9 may utilize the game services provided by GCS1, and user U5, user U10, and user U11 may utilize the game services provided by GCS6, based on geographical distance to respective CGSs.

In another embodiment, when a user is located approximately in the middle of two GCSs, the user may access the game services provided by both GCSs. For example, user U3 is located approximately in the middle of GCS2 and GCS5. When user U3 is trying to log into his account, the user device of user U3 may be connected to either GCS2 or GCS5, or both GCSs, depending upon the work load and latency of the GCSs. In still another embodiment, a user may be connected to a GCS that is not the closest one to this user because the GCS that is closest to this user is experiencing heavy work load. For example, user U4 may be initially connected to GCS6 because user U4 is located closest to GCS6. Due to heavy work load of GCS6, user U4 may be disconnected from GCS6 and be connected to GCS5. During the period of switching from GCS6 to GCS5, user U4 may be temporarily connected to both GCS6 and GCS5 for a while, and then get disconnected from GCS6 after GCS5 has replicated the game state of user U4 in GCS6. Thus, the switching from one GCS to another GCS is transparent to the user without affecting the user's experience with the game. In another example, user U4 may be directly routed to GCS5 because GCS5 has larger capacity than GCS6.

Figure 1C:
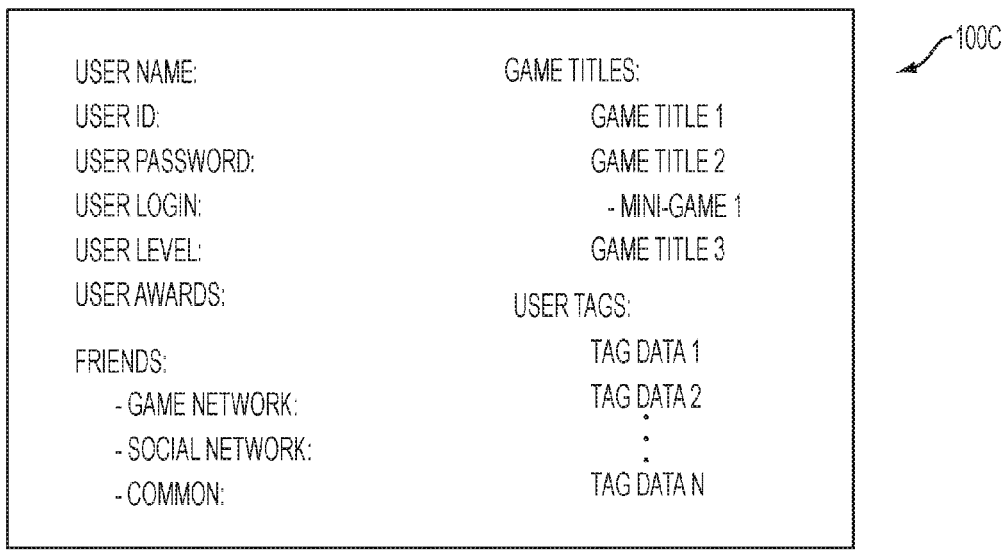
FIG. 1C illustrates an exemplary user profile stored in a game cloud system, in accordance with one embodiment of the present invention.

FIG. 1C illustrates an exemplary user profile 100C stored in a game cloud system 110, in accordance with one embodiment of the present invention. In one embodiment, user profile 100C may be saved in a user database stored in game network user store 165 of game cloud system 110. In this example, user profile 100C includes a "User Name" field, a "User ID" filed, a "User Password" field, a "User Login" field, a "User Level" field, a "User Awards" field, a "Friends" field, a "Game Titles" field, and a "User Tags" field.

In one embodiment the friends field may be populated automatically by accessing external social networks. In this embodiment, the game cloud system may include code instructions that enable calls to external application programming interfaces (APIs) of social networks. The APIs can be used to query the social networks for data concerning the social grid, and relationships stored in the social grid of the social network. The data obtained from the social grid may be used to introduce the mini-games to friends of the user, such as by automatically posting mini-games to newsfeeds of friends or the like. These functions will enable wider sharing, tagging, rating, and commenting on mini-games as they are shared and used in greater extents.

In one embodiment, the "User Name" field, the "User ID" field, and the "User Password" field are used to record the name of the user, the ID assigned to the user when he or she created the user account in game cloud system 110, and the password set up by the user. The "User Login" field is used to indicate whether this user is currently logged into his or her user account. As discussed above, the user login information may be updated by user processor 174. The "User Level" field is used to indicate the game play levels of the user. The "User Awards" field shows the awards received by the user during previous game plays.

In one embodiment, the "Game Titles" field shows all available game titles for the user. The available game titles may be those that the user is able to freely play because either the user purchased the game or the game is free to play. In still other embodiments, the "Game Titles" field can show or identify the games that the user is able to see, such as, based on the rating of the games. If the play is a minor, only selected games would be made accessible for that player.

As discussed above, a user may create one or more mini-games based on a video recording of a game title played by the user. If one or more mini-games are created for the game title, the created mini-games will be shown under this game title. In this example, there are three available game titles for the user (Game Title 1, Game Title 2, and Game Title 3), and one mini-game (Mini-Game 1) is created from Game Title 2. In one embodiment, the user can start to play a game by selecting (clicking, touching, etc.) on the available game title shown in user profile 100C. In still other embodiments, mini-games can be shown on a separate webpage, where a user can select to play mini-games created by the user or created by other users. The mini-games shown can be organized based on game-types, genres, age appropriate, etc. Mini-games having larger numbers of user interactions (e.g., plays or tags) maybe ranked higher or placed in a more prominent location on the webpage. From this webpage of mini-games, users can access to play such mini-games or share the mini-games with others within the game network or externally via social networks.

In one embodiment, the "User Tags" field in user profile 100C lists tag content entered by the user. As discussed above, the entered tag content is stored in tag data store 163. For each tag content listed in the "User Tags" field, there is an associated tag pointer that points to the tag content stored in the tag data store 163. The tag content stored under the "User Tags" field may be (a) tag data entered by the user during a game play of the original full game title, (b) tag data entered by the user while viewing the video recording from the game play of the full game title, (c) tag data entered by any user viewing the portion of the video recording used to make or define the mini-game, or (d) tag data entered by any user while playing the mini-game for the video portion (the portion being the portion that was selected from the video recording to define the mini-game).

In one embodiment, a mini-game may be created by a user that owns or has access to a full version of the game that is used to create the mini-game. When a user plays the full version of the game, a video recording is created of the game play. From this video recording, the user can select a portion of the video recording (e.g., a starting point and an ending point). This portion of the video is saved and associated to the user. In addition, this portion is used to identify metadata and state data that was created when the full version of the game was played to create the video recording. This information is in turn used to identify the code parts of the full game code that will be required to create an executable mini-game that will encompass at least the functionality seen in the portion of the video that was selected from the video recording. In one embodiment, once the mini-game is created, the mini-game may have two parts.

For example, a first part is the portion of the video selected by the user, from the full video recording. This portion can be posted and shared, so that other users can see a video of the user's game play and the results (which may have been interesting). Once a person views the video portion, the person can elect to play a mini-game for that portion of video.

Also for example, a second part is the executable mini-game. As in the example above, if the portion of the video shows the user jumping an obstacle on a bike, the mini-game will provide code to allow another play to attempt the jump of the obstacle on the bike. The game scores achieved by the original player using the full game can then be compared to the score achieved by the other play. The other play may also get a good score, which may be interesting to share.

Thus, to provide further sharing, a third part may be the creation of a secondary video portion that is a recording of game play of the mini-game by other users. Thus, as more players play the mini-game, there will be many secondary recordings of those game plays, which will also be saved and associated with the original mini-game and to the players.

In this example, however, the creator of the mini-game is going to be the owner of the full version of the game. If the person playing the mini-game wishes to make a mini-game him or herself, that person can purchase the full copy (or full locked access) and produce his or her own mini-games that can be shared in the same way.

In one embodiment, the "Friends" field in user profile 100C shows the user's friends in both game network and social network. In this example, the user's game network friends are shown under the "Game Network" sub-field and the user's social network friends are shown under the "Social Network" sub-field. The user's friends who belong to both the game network and the social network may be listed under the "Common" sub-field.

For a user profile stored in game network user store 165, the "User Name" field, the "User Login" field, the "User Level" field, and the "User Awards" field may be viewable to other users in the game network, while the other fields in the user profile may not be viewable to other users. In one embodiment, a user may select whether to make the "Friends" field in his or her user profile to be viewable by other users.

Figure 2:
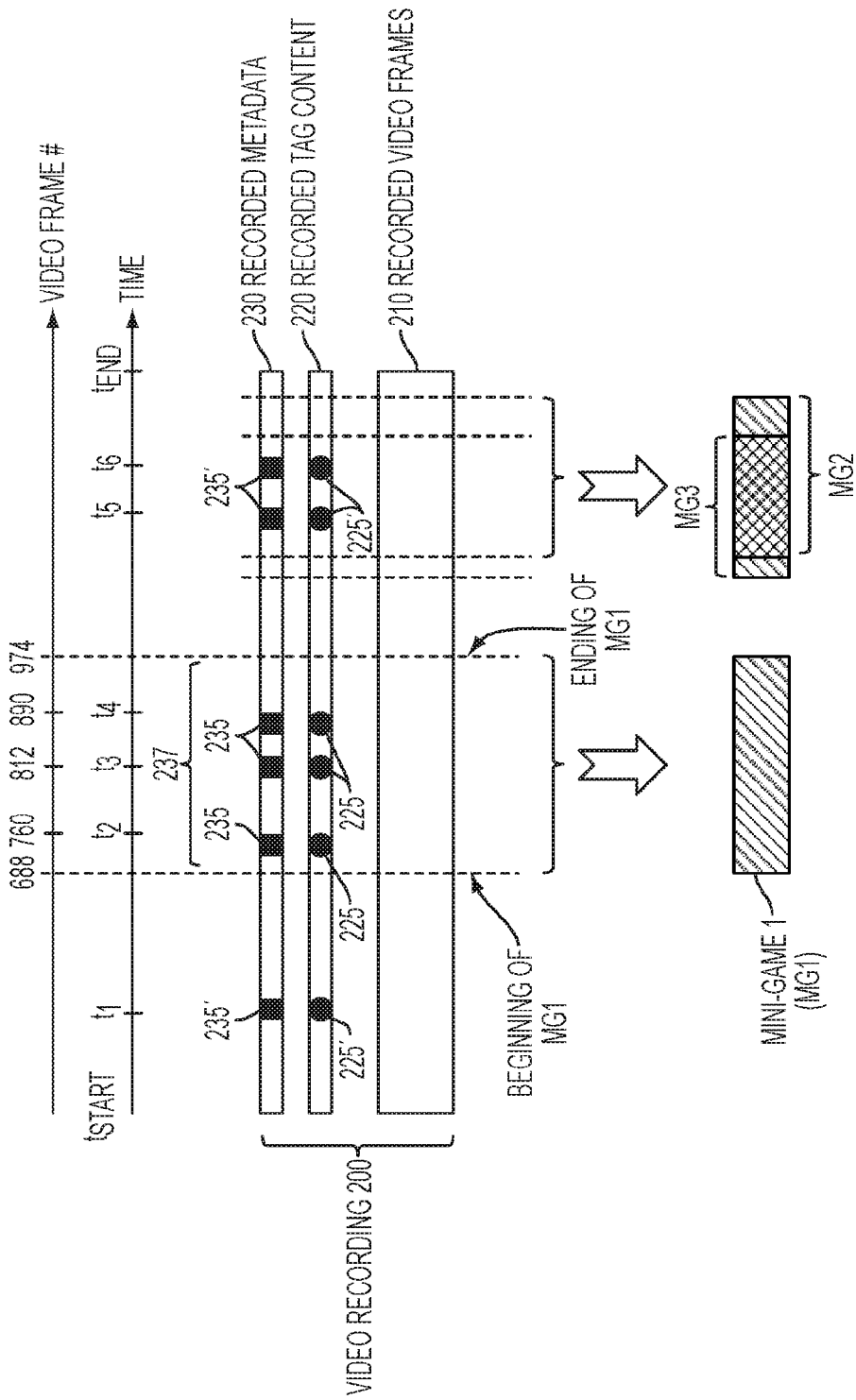
FIG. 2 illustrates mini-games created based on a video recording, in accordance with one embodiment of the present invention.

FIG. 2 illustrates mini-games created based on a video recording 200, in accordance with one embodiment of the present invention. In this example, after a user (or a game player) has played an available game title, either the complete game or part of the game, the game played may be saved as video recording 200, e.g., in recorded game store 162. In this example, video recording 200 includes recorded video frames 210 for the game played, recorded tag content 220, and recorded metadata 230. Recorded tag content 220 includes tag pointers that pointer to game tag data 225 and 225' (represented as solid circles) added during the game play (e.g., tags added when the game is paused or the like), the time when the game tag data 225 and 225' was entered and associated video frames for game tag data 225 and 225'. For example, game tag data 225 are respectively entered at time t2, t3, and t4, and is associated with video fames number 760, 812, and 890 of recorded video frames 210. In one embodiment, game tag data 225 and 225' may be stored in tag data store 163 of game cloud system 110, and be pointed by game tag data pointers stored in recorded tag content 220.

In one embodiment, when a game player wants to enter game tag data during the game play or execution, the game player can send a pause indication to suspend the game play through a user interactive input, e.g., a tagging button displayed on a display of the user device used to play this game. When the game play is suspended, the game state in response to the pause indication may be stored in game state store 160 of game cloud system 110. The solid squares 235 and 235' in recorded metadata 230 indicate the corresponding saved metadata (including game state) when game tag data 225 and 225' are entered, respectively. When video recording is viewed, the associated tag content may be shown along with the video frames in recorded video frames 210.

In one embodiment, the game player may create a mini-game (MG) based on video recording 200 by indicating a start position and an end position of the mini-game, during or after a view of video recording 200. For example, based on video recording 210, the game player may choose video frame 688 as the beginning of MG1 and video frame 974 as the ending of MG1 by clicking and unclicking a mini-game creation check box displayed on a screen, respectively. Other controls may also be provided to indicate the desire to create a mini-game, such as touch screen inputs, voice inputs, gesture inputs, etc. The created MG1 is playable to view the video recording of MG1 that is a portion of video recording 200, and is executable to play game code of MG1 that is a portion of the full game codes of the original game title played by the game player. The video recording of MG1, in one embodiment, has associated therewith game tag data 225 and metadata 237. When the video recording of MG1 is viewed, game tag data 225 may be shown along with the associated video frames for MG1. As noted above, the tag data can be provided in various forms. One form, for example, may include ranking data provided by views or players of the mini-game. The ranking can be used to later present or surface particular mini-games on a mini-game site, a website, a social site, a posting on a social network, etc. In one embodiment, it can be an option to turn on or off the viewing of the tags when viewing the recorded video of MG1.

In another embodiment, multiple mini-games can be created based on video recording 200. As shown in FIG. 2, MG1 is not overlapped with MG2 and MG3, and MG2 and MG3 are partially overlapped with each other. In one embodiment, the created mini-games, e.g., MG1, MG2, and MG3, may be saved in recorded game store 162 by mini-game processor 172 of game cloud system 110.

FIG. 3A illustrates a mini-game data profile 300A, in accordance with one embodiment of the present invention. In one embodiment, mini-game data profile 300A is saved in a database stored in mini-game data store 166 of game cloud system 110.

In this example, mini-game data profile 300A may include, without limitation, the "Mini-game Name" field, the "Original Game Title" field, the "Mini-game Code" field, the "Mini-game Beginning Data" field, the "Mini-game Ending Data" field, the "Tag Content" field, the "Social Network Content" field, the "Mini-game Creator" field, the "Mini-game Creation Time" field, the "Mini-game classification" field, and the "Mini-game Ranking" field. The "Mini-game Name" field is used to record the name of the mini-game, and the "Original Game Title" field is used to list the name of the original game based on which the mini-game is created. The name of the user who created the mini-game along with the mini-game creation time may be recorded under the "Mini-game Creator" field and the "Mini-game creation Time" field, respectively.

The "Mini-game Code" field is used to record a game code beginning pointer that points to the beginning of the game code of the original game and a game code ending pointer that points to the ending of the game code of the original game. It should be understood that the beginning and end of the game code is simply used to connote the start and end of the mini-game, which is constructed or assembled using the game code of the full game. In many instances, the mini-game will inherit game code settings that may be been set when the game was first played in the context of the full game. For example, if the character is customized to have a particular look that customization may be selected for the mini-game segment. In other embodiments, default customizations or settings are automatically made in the definition of the mini-game code. In one embodiment, the "Mini-game Beginning Data" field is used to record a video beginning pointer that points the beginning of the video recording of the game play for the original game title. In one embodiment, the "Mini-game Ending Data" field is used to record a video ending pointer that points to the ending of the video recording of the game play.

In one embodiment, the "Game Tag Data" sub field under the "Tag Content" field may be used to record the pointers that point to the game tag data entered for the video frames associated with the mini-game during the game play for the original game or during a view of the video recording of the game play. The "Mini-game Tag Data" sub field under the "Tag Content" field is used to record the pointers that point to the mini-game tag data entered during views of the mini-game.

In one embodiment, the "Social Network Content" field may be used to record the number of times the mini-game is tagged, shared, played, viewed, commented on, and recommended. The rate at which any of these social actions take place can also be tracked, which can be used as a metric to infer a higher rating or lower.

In one embodiment, the number of times the mini-game is shared may be recorded under the "Shared" sub field. In one embodiment, the number of times the mini-game is played or executed may be recorded under the "Played" sub field. The number of times the mini-game is viewed may be recorded under the "Viewed" sub field. The number of times the mini-game is recommended may be recorded under the "Recommended" sub field. The "Social Network Content" field may also be used to record the number of comments entered by network users, e.g., under the "Comments" sub field. The "Mini-game Play Videos" sub field under the "Social Network Content" field may be used to record the number of mini-game play videos created based on the executions of the mini-game, the names of the users who created those mini-game play videos along with their playing scores. In one embodiment, the social network content of a mini-game may be received via social connection manager 195 of game cloud system 110. These examples are provided for clarity, but it should be understood that fewer or more metrics can be captured or displayed to generate the ranking data.

In one embodiment, mini-game processor 172 of game cloud system 110 may classify the mini-game based on the pre-defined categories. For example, the mini-game may be classified as an action mini-game. The classification of the mini-game may be recorded under the "Mini-game Classification" field. Further, mini-game processor 172 of game cloud system 110 may be used to rank all of the mini-games in each classified category based on the tag content and the social network content associated with each mini-game. The ranking of a mini-game may be saved in the "Mini-game Ranking" field.

Figure 3B:
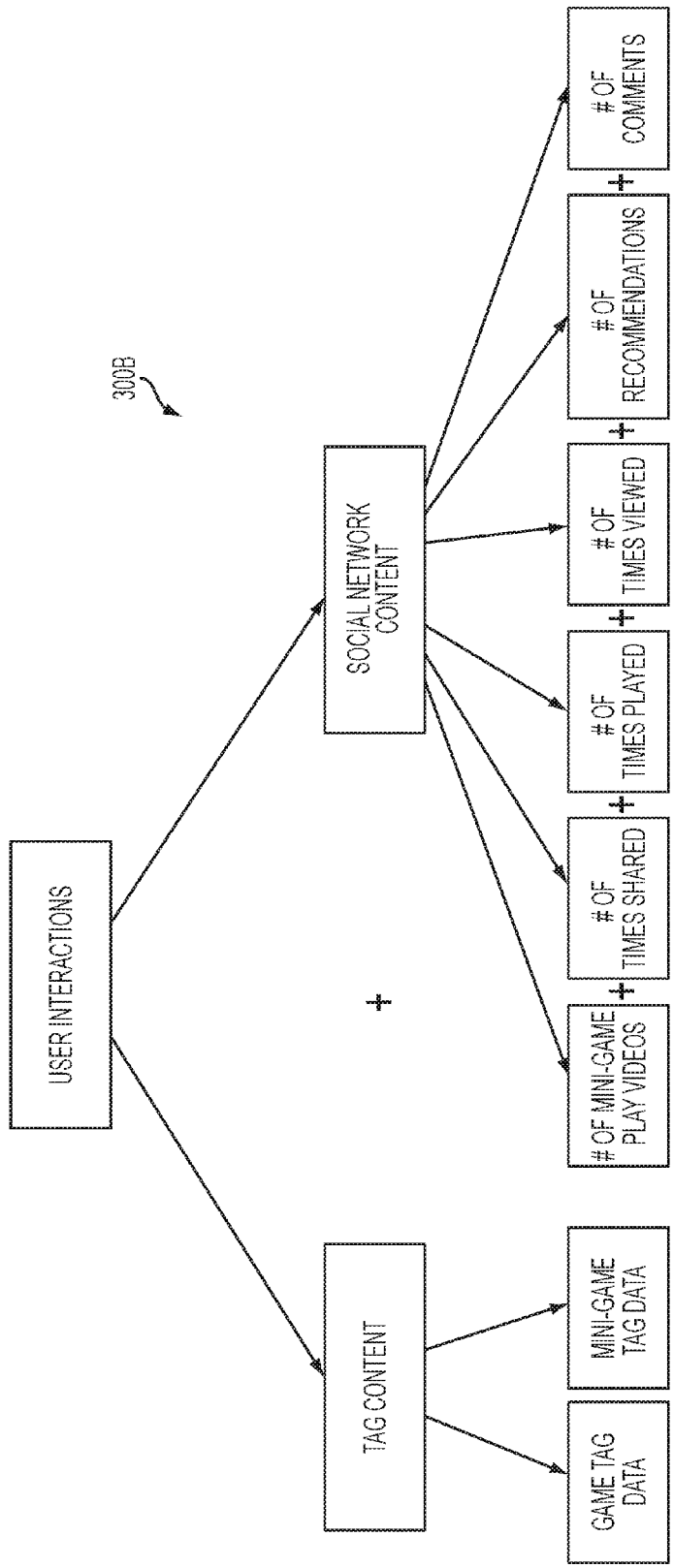
FIG. 3B illustrates a block diagram showing the components of the user interactions for a shared mini-game, in accordance with one embodiment of the present invention.

FIG. 3B illustrates a block diagram 300B showing example components of the user interactions for a shared mini-game, in accordance with one embodiment of the present invention. As shown, the user interactions of a shared mini-game may include the tag content and the social network content of the mini-game. The tag content of the mini-game may further include game tag data and mini-game tag data. The game tag data are entered for the video frames associated with the mini-game during the execution of the game play for the original game title, based on which the mini-game is created. The mini-game tag data are entered during the view of the mini-game for the mini-game video frames. The tag data can also include, for example, user ratings. The user ratings can include thumbs up, star ratings, likes, dislikes, approvals, disapprovals, etc.

The social network content of the mini-game is generated by the social network users after the mini-game is posted for sharing in a social network or a site. For example, the social network content may include, without limitation, the number of times the mini-game is shared, the number of times the mini-game is played, the number of times the mini-game is viewed, and the number of times the mini-game is recommended by various users in the social network. The social network content may also include the number of comments made by the social network users, and the number of mini-game play videos created based on the execution (or play) of the mini-game. Further, the number of times the created mini-game play videos are viewed may also be included in the social network content. In one embodiment, social network users can rank the shared mini-game, e.g., by giving one to five stars. The social network content may also include the user ranking (not shown) for the mini-game.

Figure 4A:
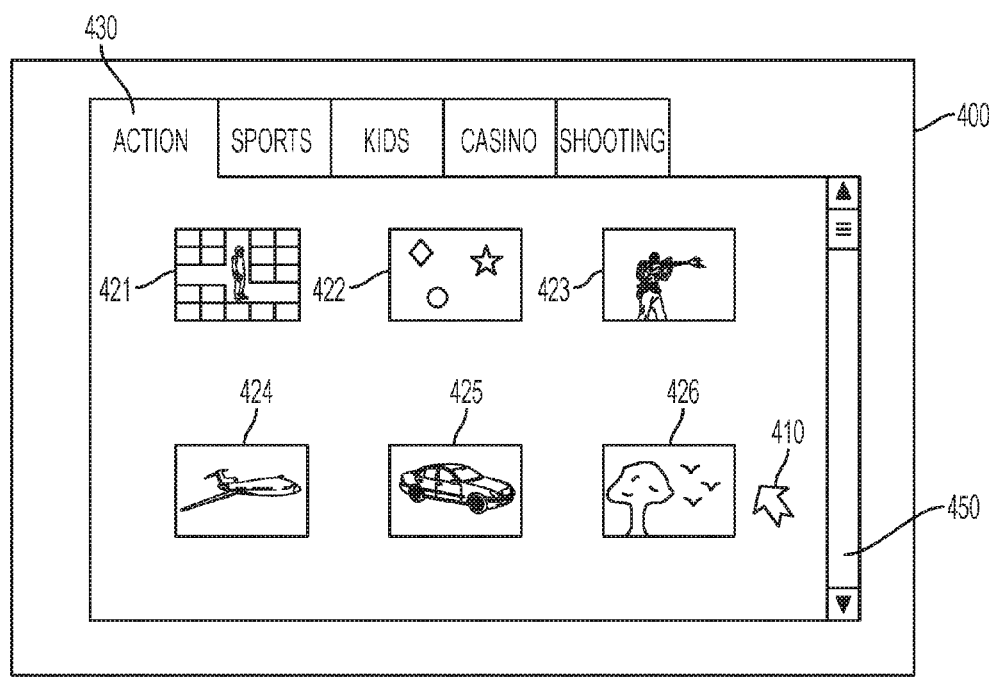
FIG. 4A illustrates a social network web page showing the classified and the ranked mini-games, in accordance with one embodiment of the present invention.

FIG. 4A illustrates a social network webpage 400 showing the classified and the ranked mini-games, in accordance with one embodiment of the present invention. In this example, all of the mini-games, which are posted in the social network for sharing, are classified based on the following pre-defined categories: Action, Sports, Kids, Casino, and Shooting. Other categories are possible, and this is only one example. The mini-games in each classified category are displayed in the form of category tabs. It is to be understood that mini-games can be classified based on other unlisted categories. In this embodiment, webpage 400 shows the mini-games in the Action category and the mini-games in other categories are hidden. The mini-games in other categories can be shown if the corresponding category tab is clicked. As used herein, the example of clicking shall be understood to be user input. The user input can be made via any number of ways, such as by computer mouse, game controllers, touch input, gesture input, voice input, etc. For example, if the Sports category tab is clicked by a user using mouse cursor 410, the mini-games in the Sports category will be shown and the mini-games in the Action, Kids, Casino, and Shooting categories will be hidden.

The mini-games in the Action category may be displayed in the forms of mini-game symbols (e.g., mini-game icons or thumbnails) with each mini-game symbol having a representative picture. In one embodiment, the representative picture is a mini-game video frame identified to have tag content exceeding a threshold. The threshold can be, for example, having a number of tags in a video frame that is more than other frames, tags that provide ratings, tags that provide higher ratings, tags that show higher levels of sharing or commenting, etc.

In this example, six mini-games symbols (421, 422, 423, 424, 425, and 426) are shown at one time in the Action category tab 430. Alternatively, more or less mini-game symbols can be displayed at one time in a category tab. In one embodiment, if there are more mini-games than the ones already displayed in the Action category, the other non-displayed mini-games can be shown by clicking either the upper or down arrows in scroll bar 450.

In one embodiment, the mini-games may be stored in recorded game store 162 of game cloud system 110, and displayed by mini-game processor 172 based on the classification and ranking of each mini-game. In one embodiment, the mini-games in a classified category may be ranked based on the user interactions of mini-games in a classified category. The examples of the user interactions of a mini-game include the tag content and the social network content of the mini-game, entered by social network users.

In one embodiment, the representative picture displayed on top of a mini-game symbol (e.g., a picture image) is a mini-game video frame that has the most tag content or higher ratings from users. The representative picture may be updated as the tag content of the mini-game changes over time. Mini-game processor 172 of game cloud system 110 may be used to identify the representative picture for each mini-game displayed.

Figure 4B:
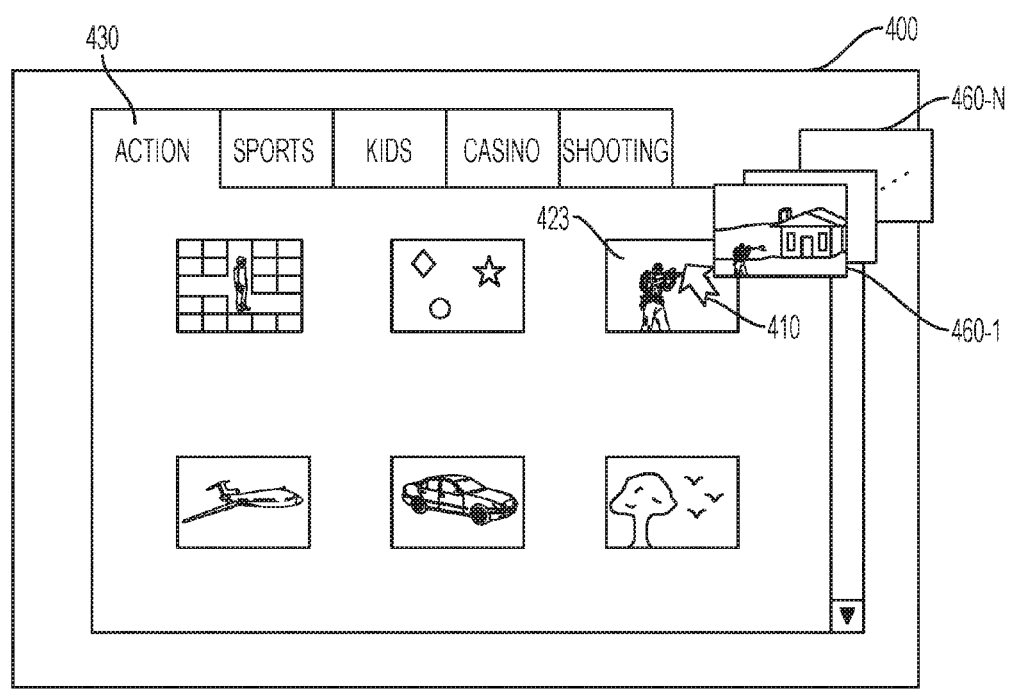
FIG. 4B illustrates an instant replay of a displayed mini-game, in accordance with one embodiment of the present invention.

FIG. 4B illustrates an instant replay of a displayed mini-game, in accordance with one embodiment of the present invention. In one embodiment, mouse cursor 410 may be hovered over a displayed mini-game symbol to render an instant replay (or partial reply) of the video frames of the mini-game represented by the mini-game symbol, without the mini-game symbol being clicked. The instant replay can help a user to quickly search for a mini-game he or she likes.

In this example, when a user hovers mouse cursor 410 over mini-game symbol 423 (e.g., passively select), the video frames (460_1 to 460_N) of the mini-game represented by mini-game symbol 423 will start to play without having to select the mini-game symbol 423. When a user finds a mini-game he or she likes, the user can double click (e.g., actively select) the mini-game symbol to launch or start instant play from the cloud gaming system in streaming mode. Alternatively, the user may double click a mini-game symbol to open another webpage that shows the mini-game represented by the mini-game symbol along with other related information.

Figure 5A:
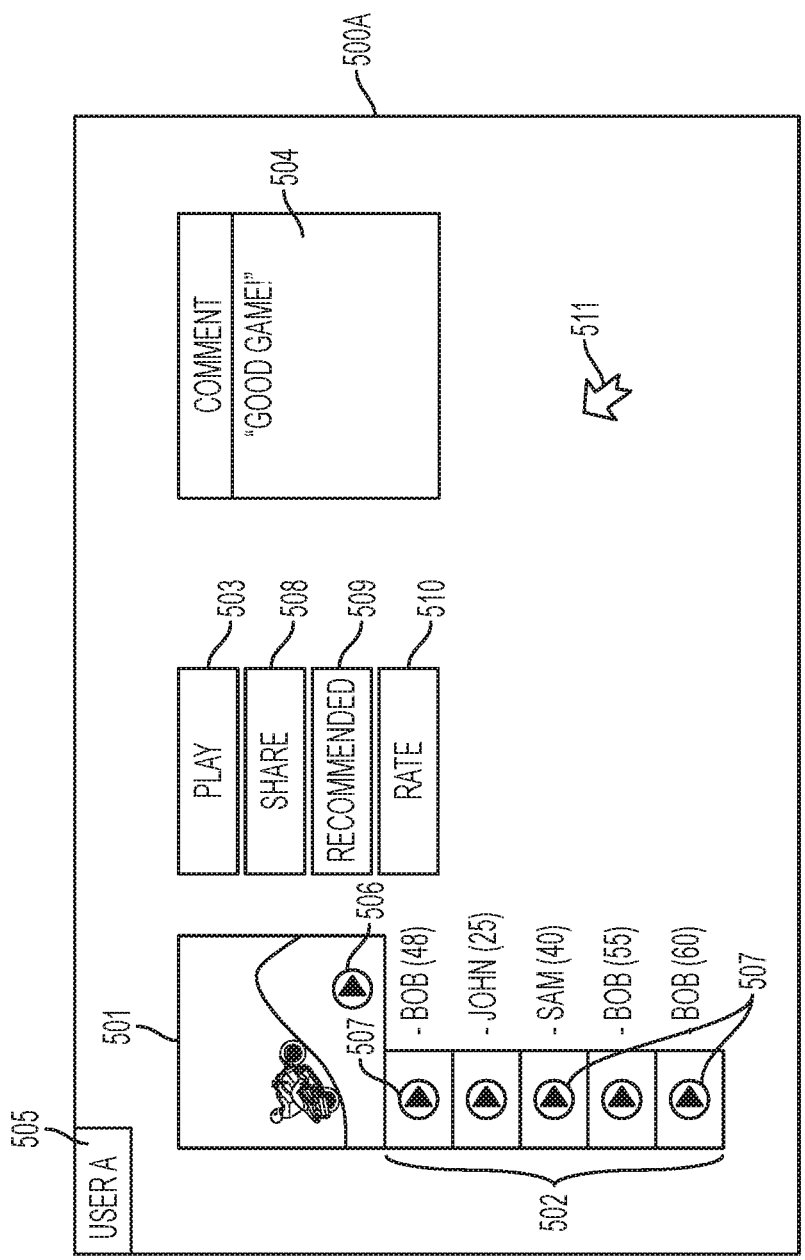
FIG. 5A illustrates a webpage that shows a mini-game along with other related information, in accordance with one embodiment of the present invention.

FIG. 5A illustrates a webpage 500A that shows a shared mini-game 501 along with other related information, in accordance with one embodiment of the present invention. In one embodiment, webpage 500A is a social network webpage of a social network user (e.g., user A), and the social network may be maintained by a social media provider 140 as shown in FIG. 1A. In one embodiment, the webpage 500A can be content that is displayed in a newsfeed of a social network. In still another embodiment, the content of the webpage 500A may be rearranged in another form, to fit within a website of the game provider or the cloud gaming network provider.

In this embodiment, webpage 500A shows a shared mini-game 501, five associated mini-game play videos (MGPVs) 502 (that are created based on the executions (or plays) of mini-game 501 by others), a play button 503 for executing the game code of the shared mini-game 501, a comment input window 504, a user identifier winder 505, a mini-game view icon 506, five mini-game play video view icons 507, a share button 508 for sharing mini-game 501, e.g., with other users who are network friends of user A, a recommendation button 509 for recommending mini-game 501, a rate icon 510, and a mouse cursor 511.

In one embodiment, user A may simply view the shared mini-game 501 by clicking mini-game view icon 506. During the view of mini-game 501, user A can initiate a tagging process by pausing the view of mini-game 501 to enter mini-game tag data, and then resuming the view of mini-game 501. The tagging process will be described in more detail related to FIG. 5B. After viewing the video recording of the shared mini-game 501, user A may play an executable version of the mini-game 501 by pushing play button 503. If mini-game 501 gets a lot of plays, either due to popularity or by sharing, the mini-game 501 may get a history of plays. The history of plays for mini-game 501 will be represented by the mini-game play video (MGPVs) 502. In one embodiment, the player and the playing score of a created mini-game play video are shown to the right of the mini-game play video 502. A user may wish to view the prior plays by clicking the corresponding mini-game play video view icon 507.

User A can also share mini-game 501 with his or her social network friends, or recommend mini-game 501 by pushing share button 508 and recommendation button 509, respectively. User comments for mini-game 501 (e.g., "Good Game!") may be entered in comment input window 504. In one embodiment, the user recommendations and sharing, and the user comments entered for mini-game 501, the number of times mini-game 501 is viewed or played, and the number of mini-game play videos 502 created based on the execution of mini-game 501 will be recorded in a mini-game data profile stored in mini-game data store 166 of game cloud system 110, as shown in FIG. 1A.

All or some of the data collected from the sharing, such as plays, sharing with others, sharing on social sites, rate of sharing, rates of tagging, number of recommendations, actual ratings, etc., can be used to generate a ranking score. The ranking score can be used to promote the mini-game and encourage additional sharing or play. Games that are higher ranked can earn rewards to the creator and can also provide a higher rating to the user that created the higher ranked mini-games.

In one embodiment, the game manufacturer of the original game title based on which mini-game 501 is created may identify the users who frequently play the shared mini-game 501 and the users who got high play scores, and send target messages, notifications, emails, and/or advertisements to those identified users. In this example, Bob has played the shared mini-game 501 three times with decent scores. Thus, the game manufacturer may send a message to Bob to advertise the original game title and offer purchase discount. Alternatively, if mini-game 501 is a very popular shared mini-game in the cloud, the game manufacture may study the video frames and the actions associated with mini-game 501 and create new games that include video frames and actions similar to the ones in mini-game 501.

Figure 5B:
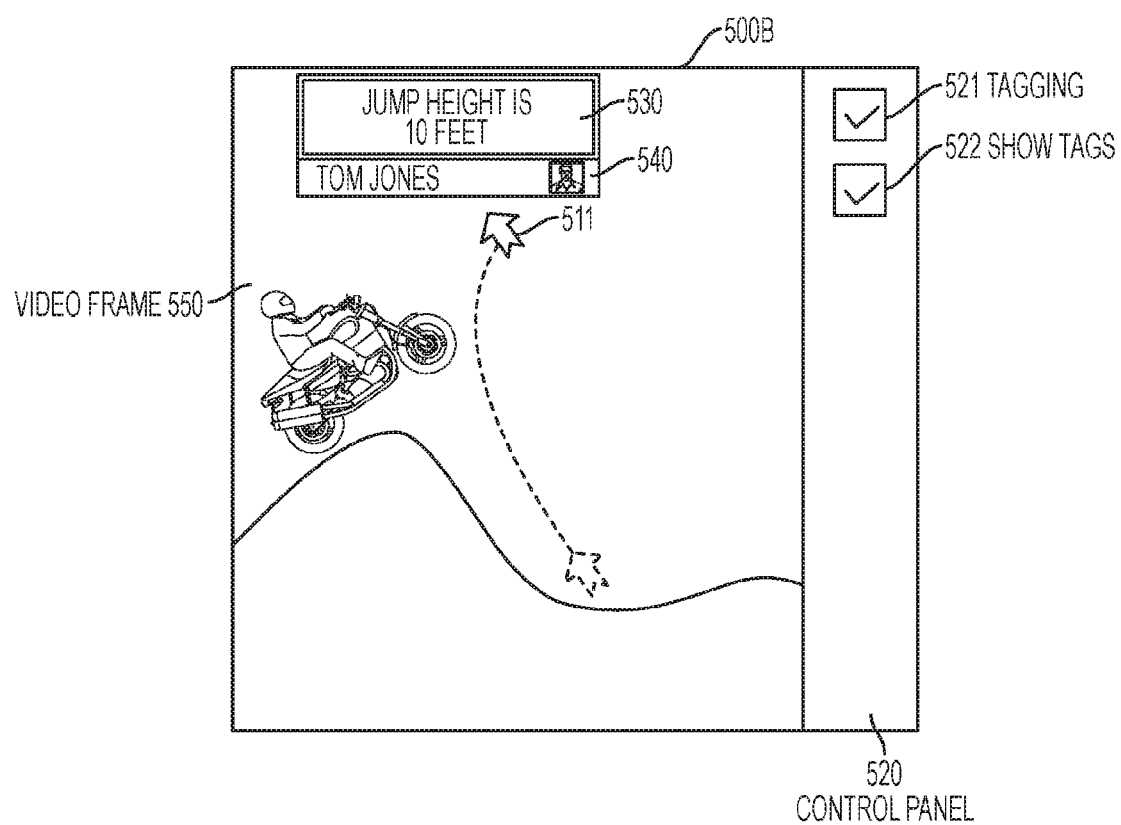
FIG. 5B illustrates a webpage that is used to view a mini-game, in accordance with one embodiment of the present invention.

FIG. 5B illustrates a webpage 500B that is used to view a mini-game, in accordance with one embodiment of the present invention. As discussed above, a mini-game can be viewed if the mini-game view button associated with the mini-game is selected. During the view of the mini-game, video frames of the mini-game may be displayed from the beginning to end and a control panel 520 may be shown along with the display of the mini-game video frames. In this example, control panel 520 includes two control check boxes: "Tagging" check box 521 and "Show Tags" check box 522. Although two check boxes are shown in control panel 520 that is displayed vertically along the right edge of webpage 500B for this embodiment, it is to be understood that in practice, more or less game control check boxes may appear in a control panel and the control panel may be shown in any position of a game display screen. Furthermore, the controls in control panel 520 may be implemented in other forms, such as radio buttons, push buttons, drop-down menus, touch icons, etc.

During a view of the shared mini-game, a user may identify a video frame (e.g., image in the video at which action is paused) of the mini-game and enter mini-game tag data in a desired location in the identified video frame. The tagging process may be started or ended by checking or unchecking "Tagging" check box 521 in control panel 520. When "Tagging" check box 521 is checked, the video frame that is currently shown, e.g., video frame 550, may be suspended by a pause indication. Then, the user may move mouse cursor 511 from the original location (shown in dashed lines) to a desired tagging location in video frame 550. In one embodiment, the user may double click the mouse in the desire tagging location to open up a tagging window 530 to enter mini-game tag data, e.g., the sentence of "Jump height is 10 feet." Although the mini-game tag data in this embodiment is text, in other embodiments, mini-game tag data may be images, video clips, etc. The entered mini-game tag data is associated with video frame 550 of the mini-game.

The entered mini-game tag data may be shown by checking "Show Tags" check box 522 in control panel 520. In this example, the user identifier of the user ("Tom Jones") who entered the mini-game tag data is shown in user identifier display 540 displayed underneath tagging window 530. In another embodiment, user identifier display 540 may also show the time when the user entered the mini-game tag data. Alternatively, the user can choose to hide the mini-game tag data by unchecking "Show Tags" check box 522.

In one embodiment, the above-described tagging process during the view of a mini-game can also be used for entering game tag data during the play of the original game or during the view of the video recording of the game play for the original game title based on which the mini-game is created.

Figure 6:
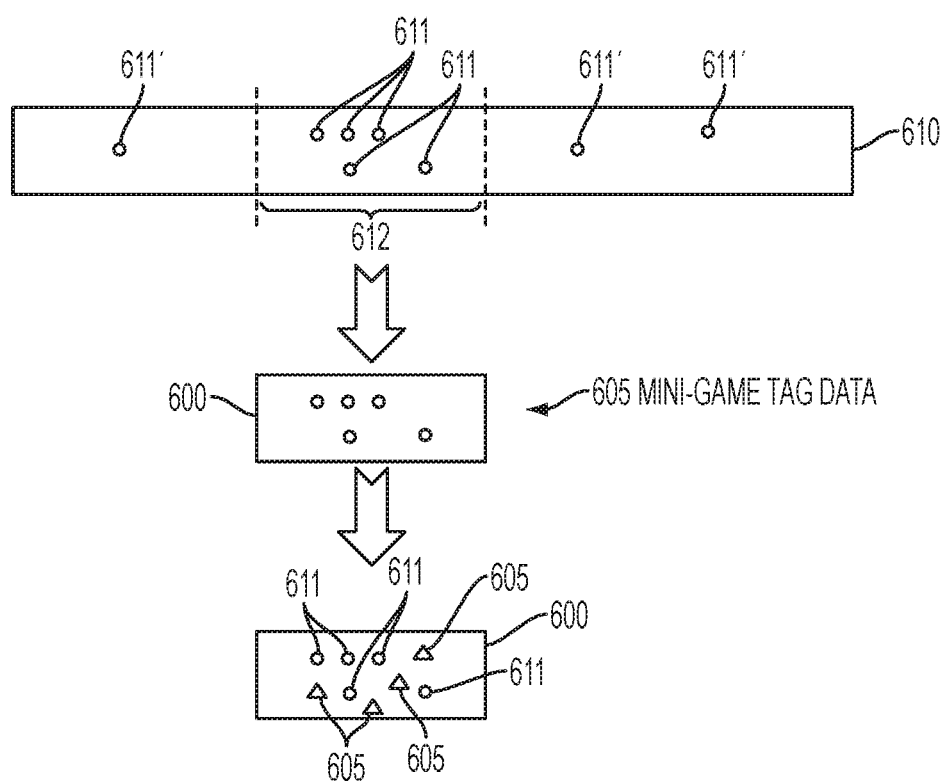
FIG. 6 illustrates a mini-game having tag content, in accordance with one embodiment of the present invention.

FIG. 6 illustrates a mini-game 600 having tag content, in accordance with one embodiment of the present invention. In this example, mini-game 600 is created based on a video recording 610 of the game play for an available game title. The video recording 610 includes game tag data 611 and 611' that are entered either during the game play or during a view of the video recording 610. The tagging process for the game tag data can be similar to the tagging process described above for entering mini-game tag data. A portion 612 of video recording 610 is used to create mini-game 600. Mini-game 600, as shown, includes game tag data 611 associated with the video frames of mini-game (e.g., the video frames of portion 612 of video recording 610). After mini-game 600 is posted for sharing in a social network webpage, e.g., by social connection manager 195, the shared mini-game 600 can be viewed by social network users. During the view of mini-game 600, mini-game tag data 605 can be entered, e.g., by using the tagging process described above in relation to FIG. 5B. Thus, after receiving mini-game tag data 605, mini-game 600 is shown having tag content that includes game tag data 611 and mini-game tag data 605.

Figure 7:
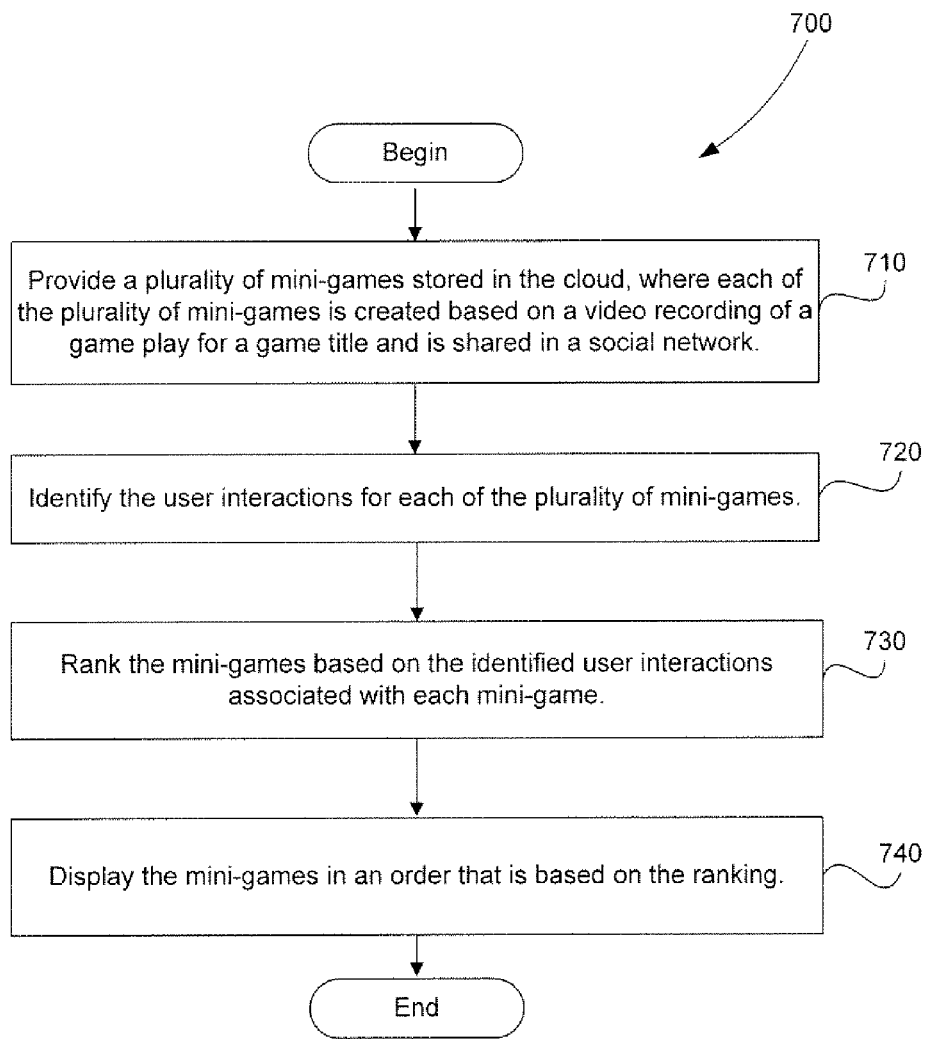
FIG. 7 is a flow chart illustrating an exemplary method for managing mini-games shared in a game cloud system, in accordance with one embodiment of the present invention.

FIG. 7 is a flow chart illustrating an exemplary method 700 for managing mini-games shared in a cloud, in accordance with one embodiment of the present invention. In one embodiment, the illustrated exemplary method 700 is described in relation to operations performed by game cloud system 110 as shown in FIG. 1A.

At operation 710, a plurality of mini-games that are stored in a cloud is provided. In one embodiment, each of the mini-games is created based on a video recording of a game play for an available game title. The plurality of mini-games may be stored in recorded game store 162, e.g., by recording engine 171 of game cloud system 110. In one embodiment, mini-game processor 172 of game cloud system 110 may be used to identify and provide the plurality of mini-games stored in the cloud. Each of the plurality of mini-games may be shared in a social network, e.g., by social connection manager 195 of game cloud system 110.

The plurality of mini-games may be classified based on the pre-defined categories. In one embodiment, mini-game processor 172 of game cloud system 110 may be used to classify the mini-games. The classification of a mini-game may be saved in a mini-game data profile associated with the mini-game stored in mini-game data store 166 of game cloud system 110.

At operation 720, the user interactions for each mini-game is identified. In one embodiment, the user interactions may include tag content and the social network content for each mini-game. In one example, mini-game processor 172 of game cloud system 110 may be used to identify the tag content and the social network content for each mini-game. The tag content of a mini-game may be obtained by tag processor 173 of game cloud system 110 and is saved in tag data store 163 of game cloud system 110. The social network content of a mini-game may be obtained by social connection manager 195 of game cloud system 110 and is saved in social network data store 167 of game cloud system 110. In one embodiment, the tag content and the social network content of a mini-game may be saved in a mini-game data profile associated with the mini-game, e.g., by mini-game processor 172, in mini-game data store 166 of game cloud system 110.

At operation 730, the mini-games are ranked based on the identified user interactions associated with each mini-game. In one embodiment, mini-game processor 172 of game cloud system 110 may be used to rank the mini-games based on the identified tag content and the social network content. For example, if a mini-game has more tag content and/or social network content, the mini-game may be ranked higher than the mini-game that has less tag content and/or social network content. The tag content may include game tag data and mini-game tag data. The game tag data of a mini-game may be entered for the video frames associated with the mini-game during the game play for the game title based on which the mini-game is created, or entered for the video frames associated with the mini-game during a view of the video recording of the game play. The mini-game tag data of a mini-game may be entered during a view of the mini-game. The social network content of a mini-game may include, without limitation, the number of times the mini-game is shared, the number of times the mini-game is played, the number of times the mini-game is viewed, the number of times the mini-game is recommended, the number of comments entered for the mini-game, and the number of mini-game play videos created based on the execution of the mini-game.

At operation 740, the mini-games may be displayed in an order that is based on the ranking. In one embodiment, mini-game processor 172 of game cloud system 110 may be used display the ranked mini-games in each classified category in a social network webpage. In some embodiment, certain mini-games having a higher ranking can be auto posted to friends of the creator or to people in the social network that may be related either by similar game plays, related friends, owning of similar game titles, etc. The posting can be to a social network stream or to a website where mini-games are shared. In one embodiment, each of the mini-games may be displayed in the form of a mini-game symbol (e.g., mini-game icon or mini-game thumbnail) having a representative picture. The representative picture displayed on the top of a mini-game symbol may be a video frame of the mini-game that has the most tag content or most relevant tag content.

In one embodiment, when a mouse cursor is hovered over a displayed mini-game symbol, the video frames of the mini-game represented by the mini-game symbol will be played from the beginning to end without the mini-game symbol is being clicked. In one embodiment, a displayed mini-game is capable of receiving user interactions, e.g., from the social network users. The user interactions include tag content and social network content.

In one embodiment, a displayed mini-game may be executable to play by the social network users. The play of a mini-game may be recorded as a mini-game video recording. The mini-game player can choose whether to create a mini-game play video based on the mini-game video recording. The created mini-game play video can be posted for sharing and for display in the same webpage that displays the mini-game. In another embodiment, a displayed mini-game may be playable to view by the social network users. During the view of the mini-games, mini-game tag data may be entered.

In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g. in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g. accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g. feedback data) from the client device or directly from the cloud gaming server.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing mini-games executed in a game cloud system, comprising:
  providing, on a server, a plurality of mini-games, created based on a video recording of a game play for a game title, wherein and each of the plurality of mini-games is defined from a portion selected from the video recording, the portion is associated with state data produced during said game play of the game title, the state data identifies actions taken to produce scenes present in the video recording from the game title,
  identifying, for each of the mini-game, the state data to enable functionality in each mini-game, the portion is is used to identify parts of the executable code of the game title, and each part of the executable code for each mini-game is identified using pointers to access code from the executable code of the game title, wherein the plurality of mini-games are sharable to a social network; and
  detecting user interactions with ones of the plurality of mini-games that are shared in the social network, wherein user interaction with each mini-game causes construction of the mini-game using the executable code of the game title and the state data;
ranking the mini-games based on the user interactions;
wherein user interactions include game play of said ones of the plurality of mini-games via streaming execution by the game cloud system.

2. The method of claim 1, wherein each mini-game shared to the social network is displayed with a representative image from the portion selected from the video recording.

3. The method of claim 2, wherein the representative image is associated with tag content, the tag content is received from users that play the mini-games via the game cloud system.

4. The method of claim 3, further comprising:
detecting hovering over the representative image, the detected hovering causing automatic play of the portion of the video recording associated with the mini-game without the mini-game being actively selected.

5. The method of claim 1, further comprising:
enabling viewing of the portion of the video recording of a mini-game; and
enabling generation of tag data during the viewing.

6. The method of claim 1, further comprising:
generating a link to a mini-game in response to sharing the mini-game, the link being sharable via the social network or via an electronic communication.

7. The method of claim 1, further comprising:
associating recommendations to selected ones of the plurality of mini-games, the recommendations being viewable to one or more users in a social network.

8. The method of claim 1, wherein the user interactions of a mini-game include receiving tag content from users and associating the tag content to the mini-games.

9. The method of claim 8, wherein the tag content includes game tag data entered for video frames of the mini-game, the game tag data includes text comments or rating input.

10. The method of claim 1, further comprising:
obtaining social network content for each of the plurality of mini-games; and
storing the obtained social network content in a mini-game data profile associated with respective ones of the mini-games.

11. The method of claim 10, wherein the social network content of the mini-game includes one or more of number of times the mini-game is shared, number of times the mini-game is viewed, number of times the mini-game is played, number of recommendations for the mini-game, number of comments entered for the mini-game, or number of mini-game play videos created based on plays of the mini-game.

12. The method of claim 1, further comprising:
storing classification and ranking of a mini-game in a mini-game data profile associated with the mini-game.

13. The method of claim 1, further comprising:
classifying the plurality of mini-games based on pre-defined categories.

14. A system, comprising:
a game cloud system including,
a server for executing video game titles in a streaming format to remote user devices;
a mini-game processor configured to provide a plurality of mini-games stored by the game cloud system, each of the plurality of mini-games is created based on a video recording of a game play of a video game title, and each of the plurality of mini-games is defined from a portion selected from the video recording, the portion is associated with state data produced during said game play of the video game title, the state data identifies game actions taken to produce scenes present in the video recording, the state data at least partially used to identify executable code from the video game title that will enable functionality in a mini-game, the portion is used to identify parts of the executable code of the game title, and each part of the executable code for each mini-game is identified using pointers to access code from the executable code of the game title, wherein user interaction with each mini-game causes construction of the mini-game using said pointers to the parts of the executable code of the game title and the state data; and
a social media manager is configured to enable posting of at least one of the plurality of mini-games to be shared to a social network and to obtain social network content for each shared mini-game;
wherein the social media manager is configured to process tag content received from user interaction with the shared mini-game, the game cloud system, upon detecting selection of a shared mini-game via user interaction constructs the shared mini-game to enable processing of play of the shared mini-game via execution in the streaming format, wherein inputs received for play of the shared mini-game are received from remote user devices and video frames for the play of the shared mini-game are sent to the remote user devices in accordance with the streaming format.

15. The system of claim 14, wherein the mini-game processor is further configured to generate an ordering of the shared mini-games based on a ranking, the ranking resulting from the interaction of said shared mini-games.

16. The system of claim 14, wherein each shared mini-game is displayed with a representative image on a server, the representative image being from the portion selected from the video recording.

17. The system of claim 16, wherein the representative image is associated with tag content, the tag content is received from uses that play the mini-games via the game cloud system.

18. The system of claim 17, further comprising:
detecting hovering over the representative image, the detected hovering causing automatic play of the portion of the video recording associated with the mini-game without the mini-game being actively selected.

19. Computer readable media having program instructions for processing mini-games executed in a game cloud system, the computer readable media comprising:
program instructions for providing, on a server, a plurality of mini-games, created based on a video recording of a game play for a game title, wherein and each of the plurality of mini-games is defined from a portion selected from the video recording, the portion is associated with state data from generated by the game title during said game play that relates to actions taken during said game play to produce scenes present in the video recording from the game title, the state data is used to enable functionality in a mini-game, the portion is used to identify parts of the executable code of the game title, and each part of the executable code for each mini-game is identified using pointers to access code from the executable code of the game title, wherein the plurality of mini-games is sharable to a social network;
program instructions for detecting user interactions with ones of the plurality of mini-games that are shared in the social network, wherein user interaction with each mini-game causes construction of the mini-game using the executable code of the game title and the state data; and program instructions for ranking the mini-games based on the user interactions, wherein user interactions include game play of said ones of the plurality of mini-games via streaming execution by the game cloud system.

20. The computer readable media of claim 19, wherein each mini-game shared to the social network is displayed with a representative image from the portion selected from the video recording and the representative image is associated with tag content, the tag content is received from users that play the mini-games via the game cloud system, and further comprising, program instructions for generating a link to a mini-game in response to sharing the mini-game, the link being sharable via the social network or via an electronic communication.

* * * * *